United States Patent
Magedanz et al.

(10) Patent No.: US 9,448,555 B2
(45) Date of Patent: Sep. 20, 2016

(54) SYSTEMS, ASSEMBLIES, AND METHODS FOR PROGRAMMING ROBOTIC SYSTEMS

(75) Inventors: Bryan L. Magedanz, Lexington, KY (US); Ron Little, Lawrenceburg, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1057 days.

(21) Appl. No.: 13/524,123

(22) Filed: Jun. 15, 2012

(65) Prior Publication Data
US 2013/0334333 A1    Dec. 19, 2013

(51) Int. Cl.
| | |
|---|---|
| B05B 12/00 | (2006.01) |
| G05B 19/42 | (2006.01) |
| B05B 13/04 | (2006.01) |
| B23K 37/02 | (2006.01) |
| B23K 31/12 | (2006.01) |
| B05B 1/34 | (2006.01) |
| B05B 3/10 | (2006.01) |

(52) U.S. Cl.
CPC ........... *G05B 19/42* (2013.01); *B05B 13/0431* (2013.01); *B23K 31/12* (2013.01); *B23K 37/0235* (2013.01); *B05B 1/3405* (2013.01); *B05B 3/10* (2013.01); *B23K 2201/006* (2013.01)

(58) Field of Classification Search
None
See application file for complete search history.

(56) References Cited

U.S. PATENT DOCUMENTS

| | | | | |
|---|---|---|---|---|
| 5,624,586 | A | * | 4/1997 | Sobr ........................ H05H 1/34 219/121.48 |
| 5,822,877 | A | * | 10/1998 | Dai ........................ G01B 21/04 33/557 |
| 5,868,840 | A | | 2/1999 | Klein, II et al. |
| 6,209,774 | B1 | | 4/2001 | LeBlanc et al. |
| 6,374,158 | B1 | | 4/2002 | Fusaro, Jr. |
| 6,378,220 | B1 | | 4/2002 | Baioff et al. |
| 7,040,546 | B2 | | 5/2006 | Horan et al. |
| 7,839,417 | B2 | | 11/2010 | Ebensberger et al. |
| 2005/0098659 | A1 | * | 5/2005 | Milojevic ............. B05B 1/3421 239/525 |
| 2011/0043827 | A1 | * | 2/2011 | McFarland .......... G01B 11/007 356/614 |

* cited by examiner

*Primary Examiner* — Charles Capozzi
(74) *Attorney, Agent, or Firm* — Dinsmore & Shohl LLP

(57) ABSTRACT

In one embodiment, a training assembly for programming a media application system can include a self aligning chuck, and an elongate tactile member. The self aligning chuck can include an alignment orifice formed therein. The alignment orifice can receive a spray nozzle of a media applicator. The self aligning chuck can be held at a fixed position relative to the spray nozzle of the media applicator. The elongate tactile member can be engaged with the self aligning chuck. The elongate tactile member can include a proximal end that is proximal to the media applicator and a distal end that is a desired distance away from the spray nozzle of the media applicator.

20 Claims, 7 Drawing Sheets

SYSTEMS, ASSEMBLIES, AND METHODS FOR PROGRAMMING ROBOTIC SYSTEMS

TECHNICAL FIELD

The present specification generally relates to systems, assemblies, and methods for programming robotic systems and, more specifically, to systems, assemblies, and methods for programming media application systems.

BACKGROUND

During complex manufacturing processes (e.g., the manufacture of an automobile) a plurality of components and subassemblies can be joined with one another. For example, two shaped metal components can be welded to one another. Although, the weld may couple the metal components together, a seam can be formed between the edges of adjacent pieces. The seams may not be water tight, may be the source of defects during the life cycle of the article, may be a site for corrosion, and/or may be a source of undesired vibration. Swirl guns can be utilized to apply media to such seams that are configured to mitigate some of the undesired effects of the seam.

The quality of the media application can be dependent upon a plurality of factors such as, for example, the distance a spray nozzle of the swirl gun is away from the article during the application of media. Additionally, it is generally desirable to apply the media in a repeatable manner such that each article produced by a manufacturing process is treated with substantially the same amount and substantially the shape of media coating. Often the swirl gun can be mounted to a robotic actuator that is programmed to apply the media according to a programmed pattern. However, the seams and/or areas surrounding the seams may have a convoluted shape. Thus, programming the robotic actuator can be difficult and time consuming.

Accordingly, a need exists for alternative systems, assemblies, and methods for programming media application systems

SUMMARY

In one embodiment, a training assembly for programming a media application system can include a self aligning chuck, and an elongate tactile member. The self aligning chuck can include an alignment orifice formed therein. The alignment orifice can receive a spray nozzle of a media applicator. The self aligning chuck can be held at a fixed position relative to the spray nozzle of the media applicator. The elongate tactile member can be engaged with the self aligning chuck. The elongate tactile member can include a proximal end that is proximal to the media applicator and a distal end that is a desired distance away from the spray nozzle of the media applicator.

In another embodiment, a training assembly for programming a media application system can include a self aligning chuck, an elongate tactile member, an offset elongate tactile member, and a laser sight. The self aligning chuck can include an alignment orifice formed therein. The alignment orifice can receive a spray nozzle of a swirl gun. The self aligning chuck can be held at a fixed position relative to the spray nozzle of the swirl gun. The elongate tactile member engaged with the self aligning chuck. The offset elongate tactile member can be engaged with the self aligning chuck. Each of the elongate tactile member and the offset elongate tactile member can have a proximal end that is proximal to the swirl gun and a distal end that is a desired distance away from the spray nozzle of the swirl gun. The distal end of the offset elongate tactile member and the distal end of the offset elongate tactile member can be offset by an offset distance. The offset distance can be substantially equal to a width of a spray pattern of the spray nozzle of the swirl gun at the desired distance. The laser sight can be coupled to the self aligning chuck and disposed between the elongate tactile member and the offset elongate tactile member. The laser sight can emit a laser beam that travels along a laser path. The laser path can be axially aligned with the spray nozzle of the swirl gun.

In yet another embodiment, a method for programming a media application system can include receiving a spray nozzle of a swirl gun within an alignment orifice of a self aligning chuck. The self aligning chuck can be engaged with an elongate tactile member and a laser sight. The elongate tactile member can have a distal end that terminates a desired distance away from the spray nozzle of the swirl gun. The laser sight can emit a laser beam along a laser path that is axially aligned with the spray nozzle of the swirl gun. The laser beam can be aligned with a program path along a work piece. The program path can be followed along the work piece. The elongate tactile member can be in contact the work piece at least once, and out of contact with the work piece at least once. Data indicative of the program path can be stored in one or more memory components. The data indicative of the program path can be transformed, automatically with one or more processors, into a sequence of motions to be followed by a robotic actuator.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
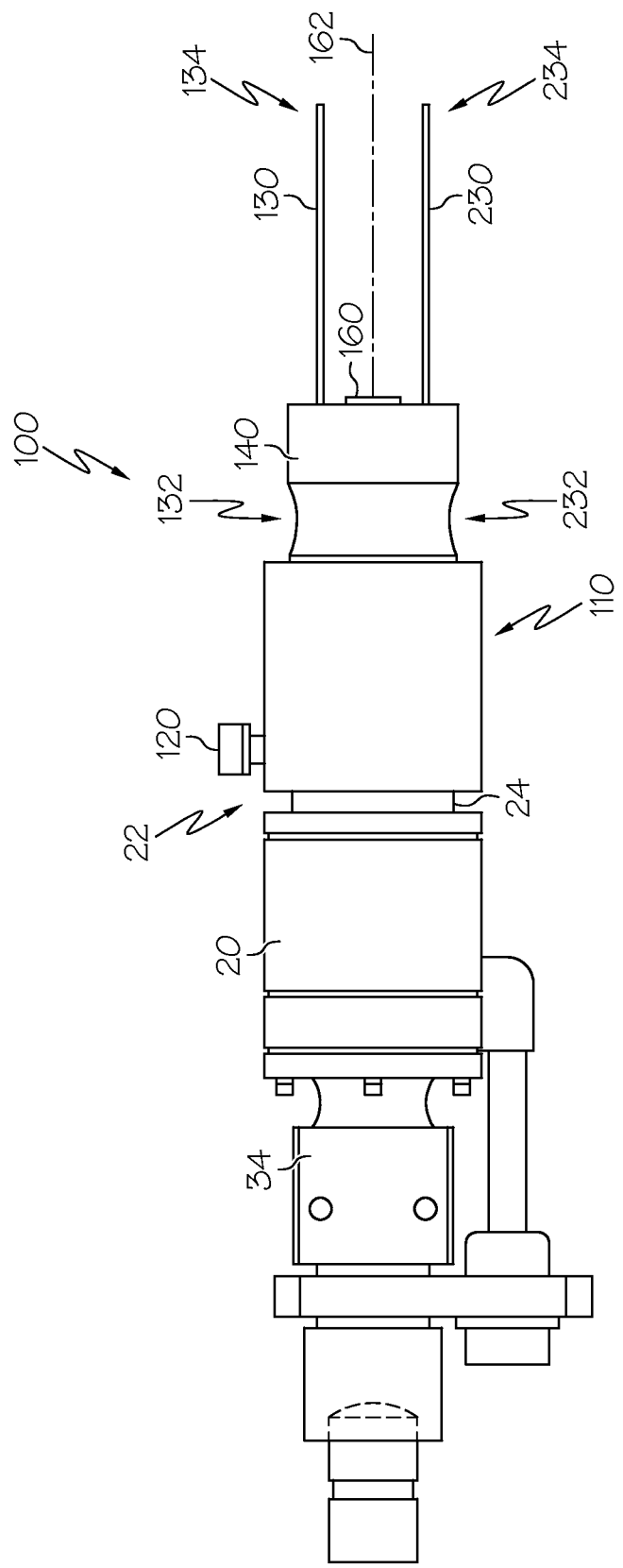
FIG. 1 schematically depicts a training assembly according to one or more embodiments shown and described herein.

FIG. 1 generally depicts one embodiment of a training assembly for programming a media application system. The training assembly generally comprises a self aligning chuck for receiving a spray nozzle of a media applicator, and an elongate tactile member for contacting a work piece during the programming of a media application system. As is explained in greater detail herein, the training assembly can be utilized in combination with a media application system to generate and save a program path for repeated application of media. Specifically, the media application system can include a robotic actuator that can be operated in a training mode, i.e., feedback from positional sensors can be recorded and stored as a path to be repeated later by the robotic actuator. A media applicator can be coupled to a media applicator, which can be received within the training assembly. The robotic actuator can be guided along a desired spray path while the media application system is in training mode. Accordingly, the path of the robotic actuator can be recorded while components of training assembly (e.g., elongate tactile member and/or laser sight) provide an indication of the spray pattern that can emitted from the media applicator. The recorded spray path can be utilized within the media application system as a program path that can be followed during the application of media from the media application system. Various embodiments of the training assembly and methods for programming a media application system with the training assembly are described in more detail herein.

Figure 2:
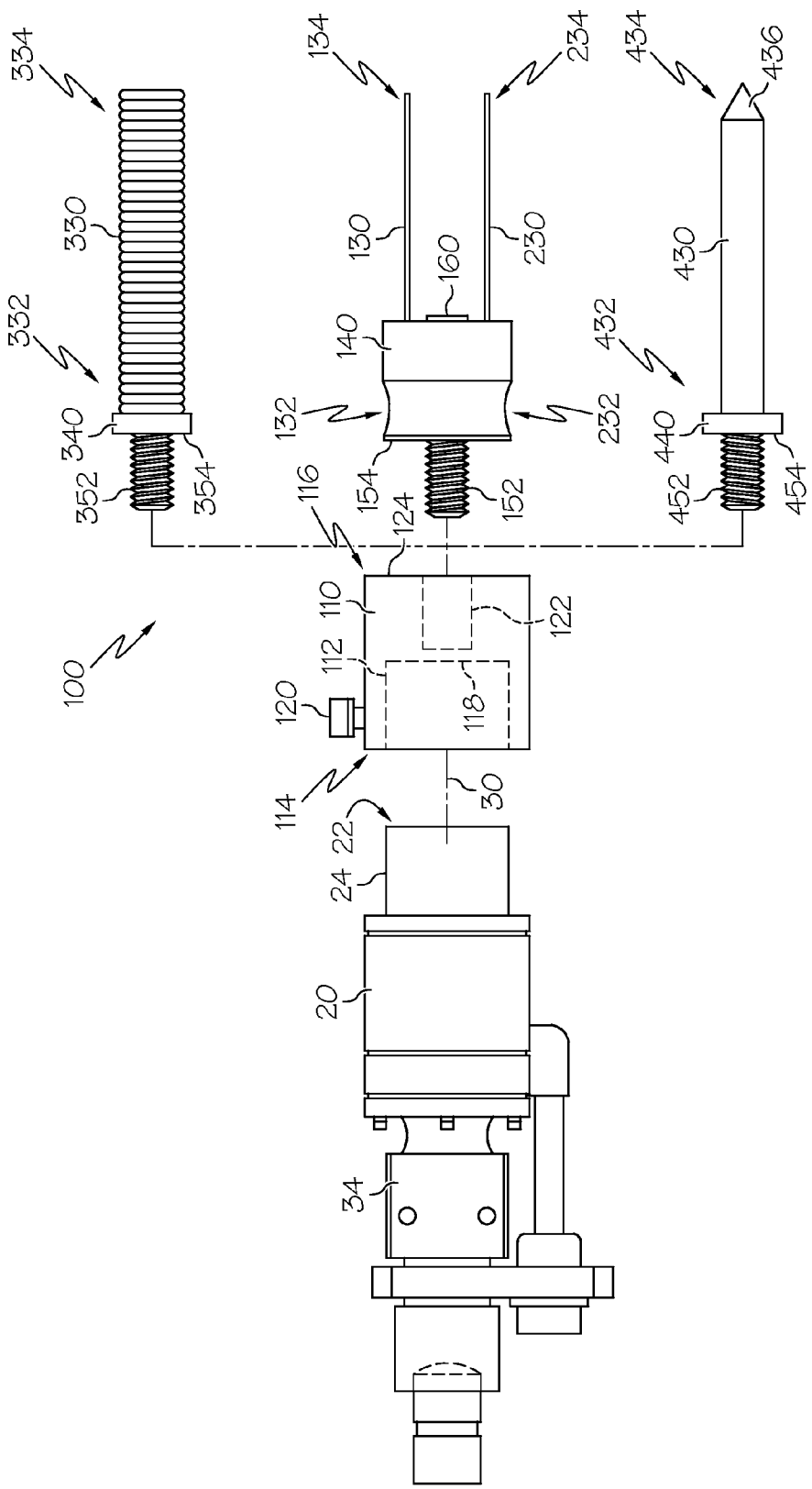
FIG. 2 schematically depicts an exploded view of a training assembly according to one or more embodiments shown and described herein.

Referring collectively to FIGS. 1 and 2, the training assembly 100 can comprise a self aligning chuck 110 that fastens to a swirl gun 20. In one embodiment, the self aligning chuck 110 can be a substantially cylindrically shaped body that extends from a proximal end 114 to a distal end 116. The self aligning chuck 110 can comprise an alignment orifice 112 that is configured to hold the self aligning chuck 110 in a substantially fixed position with respect to the swirl gun 20. Accordingly, the self aligning chuck 110 can be formed out of substantially rigid materials such as, for example, metal and/or rigid plastic (e.g., ABS plastic).

In some embodiments, the self aligning chuck 110 is configured to receive a nozzle end 22 of the swirl gun 20 within the alignment orifice 112. The alignment orifice 112 can be an opening formed within the self aligning chuck 110 that is shaped in a manner that corresponds to the shape of a portion of the swirl gun 20. For example, the alignment orifice 112 can be a substantially cylindrically shaped bore formed in a proximal end of the 114 of the self aligning chuck 110. The alignment orifice 112 can also include an alignment feature 118 that can be utilized as a reference point between the swirl gun 20 and the self aligning chuck 110. Alternatively, the alignment feature 118 can be located outside of the alignment orifice 112 such as, for example, at the proximal end 114 of the self aligning chuck 110. Although not depicted in FIGS. 1-8, the alignment orifice 112 can include a groove that holds an O-ring.

The self aligning chuck 110 can be configured to be releasably engaged with the swirl gun 20. Accordingly, the self aligning chuck 110 can include one or more releasable engagement feature 120 for releasably engaging with the swirl gun 20 such as, for example, cam locks, set screws, detents, pins (e.g., cotter pins, clevis pins, lock pins, quick release pins), snap fittings, clamps, threaded objects or the like. As used herein, the phrase "releasably engaged" can mean an engagement between two or more objects, wherein the objects can be disengaged manually without damaging, disassembling, or permanently altering the objects.

The self aligning chuck 110 can optionally be configured to receive one or more objects at the distal end 116 of the self aligning chuck 110. In one embodiment, the self aligning chuck 110 can comprise a releasable engagement feature 122 formed at the distal end 116 of the self aligning chuck 110. The self aligning chuck 110 can further comprise a chuck alignment feature 124 that operates as a reference for the training assembly 100. For example, as depicted in FIG. 1, the releasable engagement feature 122 can be a threaded bore that is formed through a surface at the distal end 116 of the self aligning chuck 110, which serves as the alignment feature 118. Accordingly, objects can be releasably engaged with releasable engagement feature 122 and in contact with the chuck alignment feature 124.

Referring again to FIG. 1, the training assembly 100 can comprise an elongate tactile member 130 for providing an offset from the swirl gun 20 and a work piece. The elongate tactile member 130 can extend from a proximal end 132 to a distal end 134. During training operations, the proximal end 132 of the elongate tactile member 130 is nearest the nozzle end 22 of the swirl gun 20. The elongate tactile member 130 can be substantially flexible and configured to deflect when contacted by a portion of the work piece. For example, the elongate tactile member 130 can be formed from a polymer, such as, for example a polyamide. Additionally, it is noted that that the training assembly 100 can optionally comprise an offset elongate tactile member 230 that extends from a proximal end 232 to a distal end 234. As is explained in further detail herein, one or both of the elongate tactile member 130 and the offset elongate tactile member 230 can be utilized to provide an indication of a spray pattern that can be emitted by the swirl gun 20.

Figure 4:
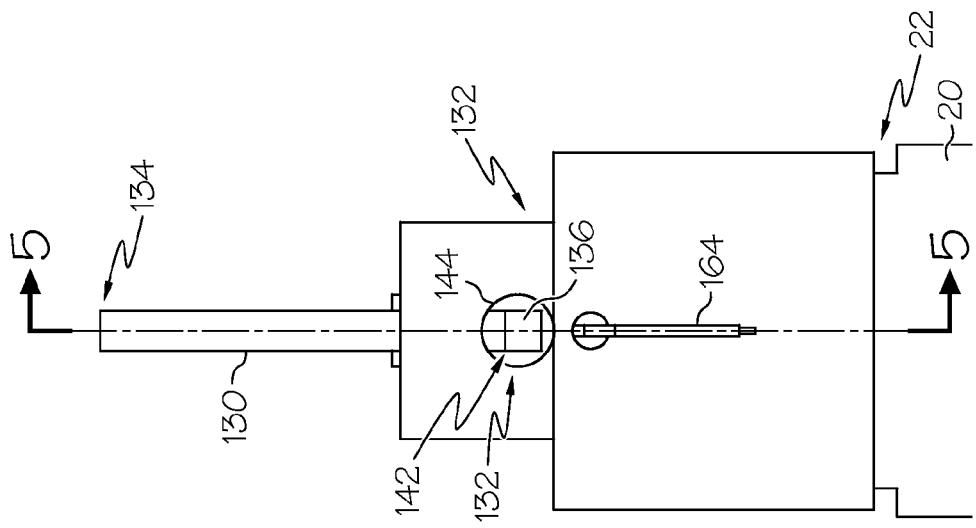
FIG. 4 schematically depicts a side view of a portion of a training assembly according to one or more embodiments shown and described herein.
Figure 3:
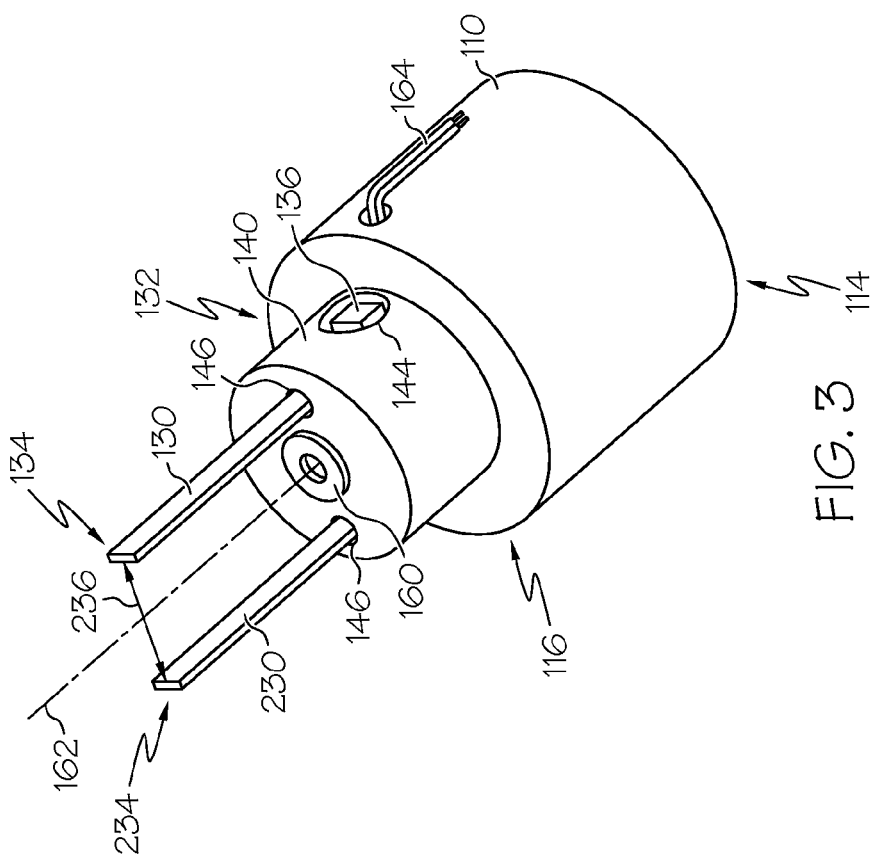
FIG. 3 schematically depicts an isometric view of a portion of a training assembly according to one or more embodiments shown and described herein.
Figure 5:
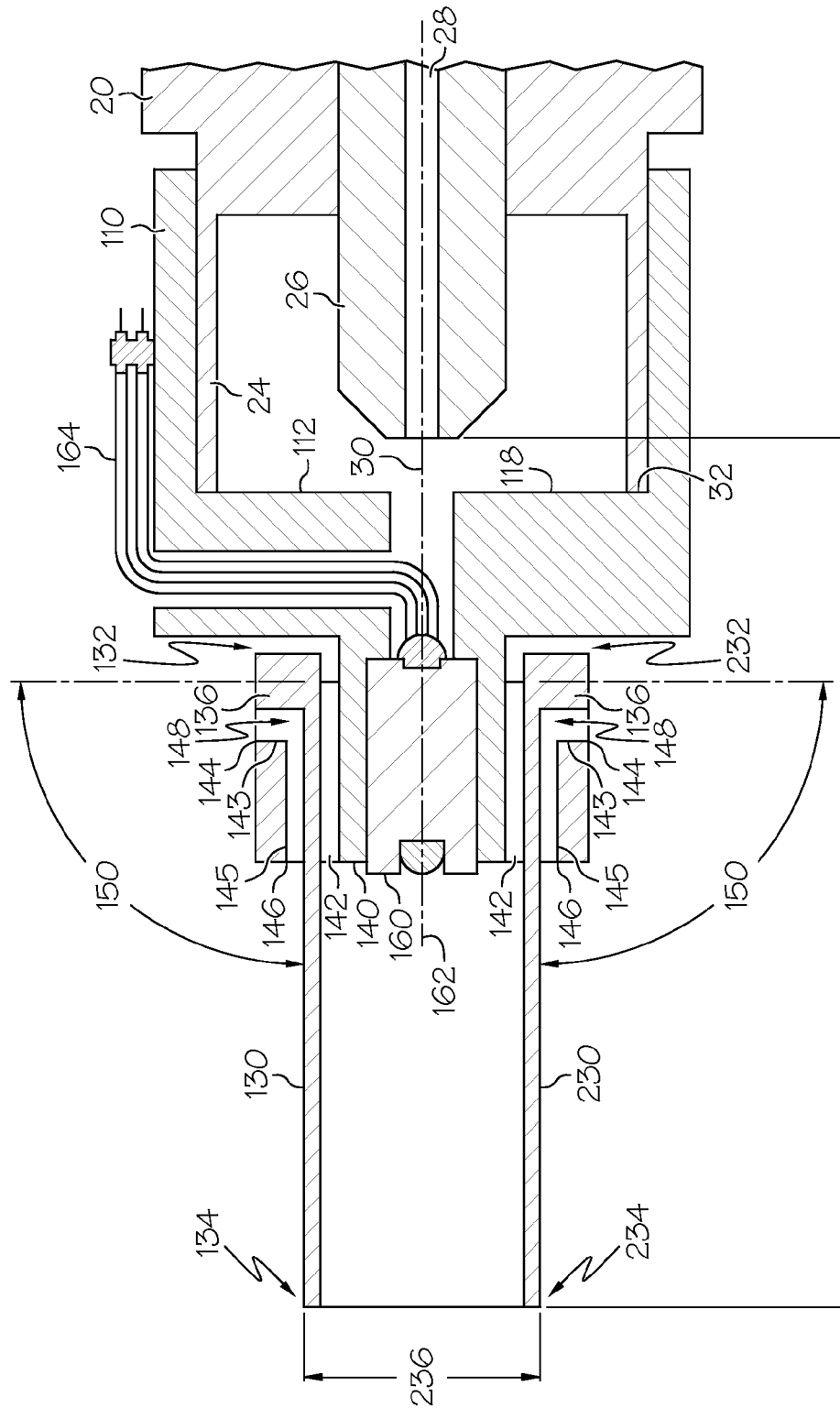
FIG. 5 schematically depicts a cross-sectional view of a portion of a training assembly depicted in FIG. 4 taken along line 5-5 according to one or more embodiments shown and described herein.

Referring collectively to FIGS. 3-5, the proximal end 132 of the elongate tactile member 130 can be engaged with a platform 140. In one embodiment, the elongate tactile member 130 can be releasably engaged with the platform 140. For example, the elongate tactile member 130 can comprise an interference body 136 located at the proximal end 132 of the elongate tactile member 130. The interference body 136 can be substantially box shaped and larger in cross-section that a narrow portion of the elongate tactile member 130 that extends from the interference body 136 to the distal end of the elongate tactile member 130. Specifically, the cross-section can be measured at a direction orthogonal to a direction along the elongate tactile member 130 from the proximal end 132 to the distal end 134. The platform 140 can include an engagement bore 142 having a first opening 144 and a second opening 146 that are configured to releasably engage the interference body 136 of the elongate tactile member 130.

The engagement bore 142 of the platform 140 can include one or more turns 148 such that the engagement bore 142 forms a convoluted path. For example, the turn 148 can be formed such that the engagement bore 142 has a redirection angle 150 that is abrupt. The redirection angle 150 can be less than about 150° such as, for example, an acute angle in one embodiment, or about a right angle in another embodiment. The engagement bore 142 can be formed to include a relatively large bore section 143 that extends from the first opening 144 to the turn 148 and a relatively small bore section 145 that extends from the turn 148 to the second opening 146.

For example, as depicted in FIG. 4, the platform 140 can be formed by a substantially cylindrical body that extends from the distal end 116 of the self aligning chuck 110 towards the distal end 134 of the elongate tactile member 130. The first opening 144 can be formed in the side of the cylindrical body and the second opening 146 can be formed in the end of the cylindrical body nearest the distal end 134 of the elongate tactile member 130. The first opening 144 and the relatively large bore section 143 can be sized to receive the interference body 136 of the elongate tactile member 130. The second opening 146 and the relatively small bore section 145 can be large enough to receive the narrow portion of the elongate tactile member 130, but too small to receive the interference body 136 of the elongate tactile member 130. In some embodiments, the platform 140 can be integral with the self aligning chuck 110. In further embodiments, the platform 140 can be configured for releasable engagement with the self aligning chuck 110.

Referring again to FIG. 2, in one embodiment, the platform 140 can include a releasable engagement feature 152 that is configured to releasably engage the distal end 116 of the self aligning chuck 110. The platform 140 can comprise a platform reference feature 154 that corresponds to the chuck alignment feature 124. For example, the platform reference feature 154 can be a surface that is contoured to match the shape of the chuck alignment feature 124. It is noted that, while the platform reference feature 154 and the chuck alignment feature 124 are depicted as substantially flat surfaces in FIG. 2, the platform reference feature 154 and the chuck alignment feature 124 can be shaped in any manner that provides a reference and allows for releasable engagement between the platform 140 and the self aligning chuck 110.

Referring still to FIG. 2, as is explained in greater detail herein, the elongate tactile member 130 can be interchangeable with an elongate tactile member 330 and an elongate tactile member 430. In some embodiments, the elongate tactile member 330 can be configured to deflect when contacted by a portion of the work piece. The elongate tactile member 330 can extend from a proximal end 332 to a distal end 334. In one embodiment, the elongate tactile member 330 can be formed by a spring member such as, for example, a coil spring, a flat spring, or a machined spring. The elongate tactile member 330 can be cantilevered from the platform 340, i.e., the proximal end 332 of the elongate tactile member 330 can be coupled to the platform 340 and the distal end 334 can be free. The platform 340 can include a releasable engagement feature 352 that is configured to releasably engage the releasable engagement feature 122 at the distal end 116 of the self aligning chuck 110. Furthermore, the platform 340 can comprise a platform reference feature 354 that corresponds to the chuck alignment feature 124 such that, when the platform reference feature 354 contacts the chuck alignment feature 124, the location of the distal end 334 of the elongate tactile member 330 relative to the self aligning chuck 110 or the swirl gun 20 is known.

FIG. 2, further depicts an elongate tactile member 430 that can be configured to be substantially rigid when contacted by a portion of the work piece. For example, the elongate tactile member 430 can be formed from substantially rigid material as compared to the elongate tactile member 130 and the elongate tactile member 330. Specifically, the elongate tactile member 430 can be formed from a metal or a rigid plastic. In some embodiments, the elongate tactile member 430 can be formed as a solid body in order to minimize the amount of deflection caused by contact with a work piece. For example, while in some embodiments, each of the elongate tactile member 130, the offset elongate tactile member 230, and the elongate tactile member 330 can be configured to deflect to relatively large angles such as, for example, up to about 90°, to bend around and clear obstructions, the elongate tactile member 430 can be configured to deflect only minimally such as, for example, less than about 5°, without damaging the work piece and/or the elongate tactile member 430.

The elongate tactile member 430 can extend from a proximal end 432 to a distal end 434 that tapers to a point 436. The proximal end 432 of the elongate tactile member 430 can be coupled to the platform 440 such that the point 436 can be utilized to contact a work piece. The platform 440 can include a releasable engagement feature 452 that is configured to releasably engage the distal end 116 of the self aligning chuck 110. Furthermore, the platform 440 can comprise a platform reference feature 454 that corresponds to the chuck alignment feature 124 such that, when the platform reference feature 454 contacts the chuck alignment feature 124, the location of the point 436 of the elongate tactile member 430 relative to the self aligning chuck 110 or the swirl gun 20 is known.

Referring again to FIG. 1, the training assembly 100 can further comprise a laser sight 160 for providing an optical reference during programming operations. Specifically, the optical reference can be provided by a laser beam that is emitted along a laser path 162. The emitted laser beam can be formed by light (electromagnetic radiation) that is generated with the laser sight 160 by the stimulated emission of photons. The laser beam can have a relatively high degree of spatial and temporal coherence, as compared to other light sources (e.g., incandescent bulb, light emitting diodes, or fluorescent lights). Accordingly, the laser beam can travel along the laser path 164 in a substantially linear manner. In some embodiments, the laser sight 160 can be powered by an internal power source (e.g., batteries). In other embodiments, the laser sight 160 can be powered by an external power source. For example, as can be seen in FIG. 5, the laser sight 160 can comprise conductive leads 164 that are communicatively coupled to the light producing portions of the laser sight 160.

Referring again to FIG. 5, as is noted above, the self aligning chuck 110 can be releasably engaged with a swirl gun 20. The swirl gun 20 comprises a spray nozzle 26 that is in fluid communication with a media source via a media flow path. The spray nozzle 26 is shaped such that the media is emitted from the spray nozzle 26 in a spray pattern aligned with the center 30 of the media flow path 28. The media emitted by the spray nozzle 26 can include sealants or adhesives such as, for example, PVC Plastisol, Expandable Sealers, Heat Cure Epoxy, Waterborne and Epoxy, Sound Deadeners, Liquid Masking, or similar fluid media. Moreover, the spray nozzle 26 of the swirl gun 20 rotates with respect to the swirl gun 20. Specifically, the swirl gun 20 can comprise a protective cover 24 that surrounds the spray nozzle 26 and the spray nozzle 26 can rotate within the protective cover 24 around the center 30 of the media flow path 28. Additionally, it is noted that, while the embodiments described herein make specific reference to a swirl gun 20, the embodiments described herein can be coupled to any media applicator that comprises a nozzle for applying media to a work piece such as, for example, a paint applicator.

The self aligning chuck 110 can be releasably engaged with a swirl gun 20 such that the spray nozzle 26 of the swirl gun 20 is received by the alignment orifice 112 of the self aligning chuck 110. The swirl gun 20 can include a gun reference feature 32 that is configured to set the relative alignment between the swirl gun 20 and the self aligning chuck 110. Specifically, the protective cover 24 can include an end surface that is utilized as the gun reference feature 32 that contacts the alignment feature 118 of the alignment orifice 112, when the swirl gun 20 is received by the self aligning chuck 110. The releasable engagement feature 120 of the self aligning chuck 110 can be engaged with the protective cover 24 such that the gun reference feature 32 and the alignment feature 118 are held in contact with one another. Alternatively or additionally, the O-ring of the alignment orifice 112 can apply a compressive force to the protective cover 24, to hold the gun reference feature 32 in contact with the alignment feature 118 of the alignment orifice 112.

As is noted above, the platform 140 can be releasably engaged or integral with the self aligning chuck 110. Moreover, the elongate tactile member 130 can be releasably engaged with the platform 140. Specifically, the elongate tactile member 130 can be seated within the engagement bore 142 such that movement of the interference body 136 is mitigated by the relatively small bore section 145 of the engagement bore 142. When seated, during normal operation of the training assembly 100, the elongate tactile member 130 can be held at a desired distance D from the spray nozzle 26 of the swirl gun 20 as it comes into contact with a work piece. Yet, the elongate tactile member 130 can be removed from the engagement bore 142 by urging the interference body 136 of the elongate tactile member 130 out of the engagement bore 142 with a force larger than the force applied by the work piece upon the distal end 134 of the elongate tactile member 130. Thus, the force needed to unseat the interference body 136 of the elongate tactile member 130 should be substantially larger than the forces encountered during normal operation of the training assembly 100 in order to avoid undesired changes in the desired distance D. In some embodiments, the desired distance D can correspond to an optimal working distance for the spray nozzle 26 of the swirl gun 20. The desired distance D can be any distance. For some swirl guns, the desired distance D can be greater than about 25 mm such as, for example, from about 35 mm to about 300 mm in one embodiment, or from about 75 mm to about 150 mm in another embodiment.

Moreover, one or more additional elongate tactile members can be releasably engaged with the platform 140. For example, an offset elongate tactile member 230, which is substantially identical to the elongate tactile member 130, can be engaged with the self aligning chuck 110. Specifically, the offset elongate tactile member 230 can include an interference body 136 that is disposed at the proximal end 232 of the offset elongate tactile member 230. The offset elongate tactile member 230 can extend from the proximal end 232 to a distal end 234. The distal end 234 can extend away from the platform 140 such that the distal end 234 of the offset elongate tactile member 230 terminates at the desired distance D away from the spray nozzle 26.

At the desired distance D from the spray nozzle 26, the elongate tactile member 130 and the offset elongate tactile member 230 can be offset from one another by an offset distance 236. Specifically, the elongate tactile member 130 and the offset elongate tactile member 230 can demarcate the extent of the offset distance 236. In some embodiments, the spray nozzle 26 can emit a substantially constant spray pattern. Specifically, the spray pattern can have a known width that is dependent upon the distance the spray pattern is away from the spray nozzle 26. Thus, the spray pattern of the spray nozzle 26 can have a known width at the desired distance D from the spray nozzle 26. Accordingly, in some embodiments, the offset distance 236 can be set to be indicative of the known width of the spray pattern at the desired distance D. For example, the offset distance 236 can be slightly larger than the known width of the spray pattern at the desired distance D, slightly smaller than the known width of the spray pattern at the desired distance D, or about equal to the known width of the spray pattern at the desired distance D. It is noted that the embodiments described herein can include any number of elongate tactile members. However, it has been discovered that four elongate tactile members may have favorable utility with spray nozzles that emit substantially circular spray patterns.

The laser sight 160 can be disposed within the platform 140. In one embodiment, the laser sight 160 can be located between the elongate tactile member 130 and the offset elongate tactile member 230. The laser sight 160 can be configured such that the laser path 162 is axially aligned with the spray nozzle 26 of the swirl gun 20, i.e., the laser path 162 and the center 30 of the media flow path 28 are aligned. Accordingly, the elongate tactile member 130, the offset elongate tactile member 230, and the laser sight 160 can cooperate to provide an indication on a work piece of the width and the center of the spray pattern to assist with programming a media application system 10, which is schematically depicted in FIG. 6.

Figure 6:
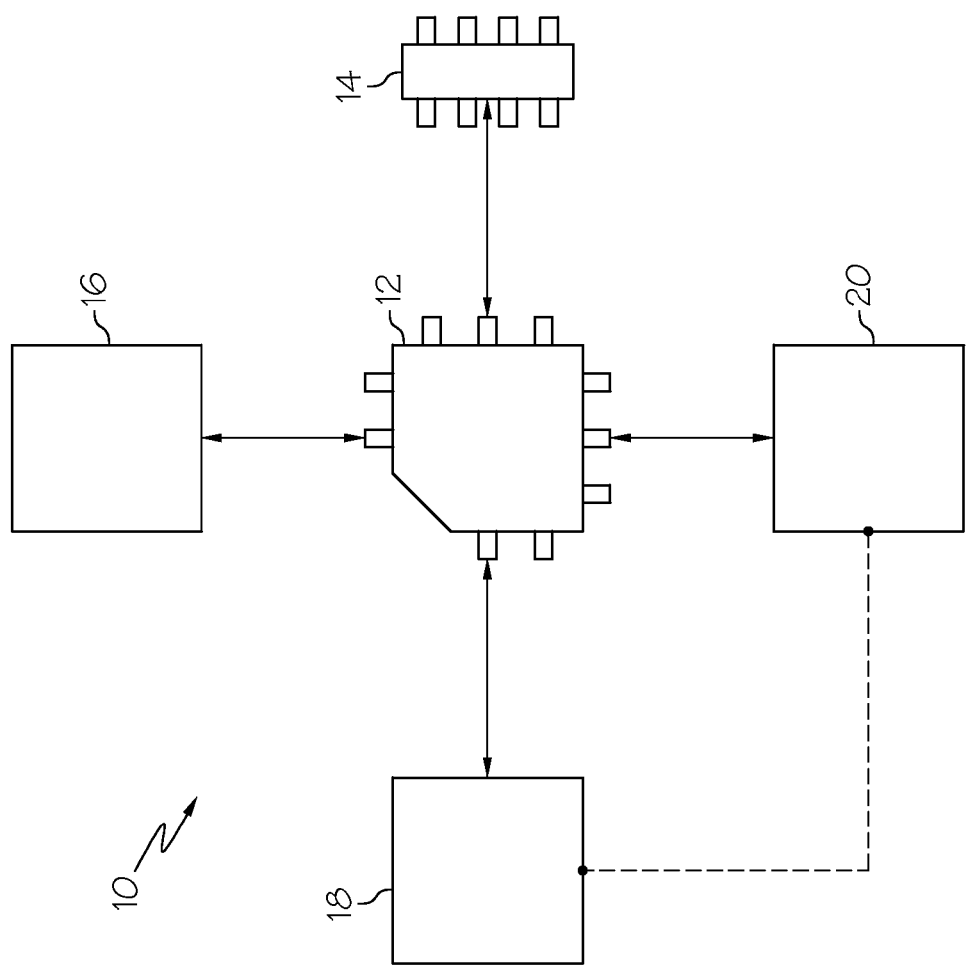
FIG. 6 schematically depicts a media application system according to one or more embodiments shown and described herein.

FIG. 6 schematically depicts a media application system 10. The swirl gun 20 can be physically coupled (generally indicated by the dashed line) and communicatively coupled (generally indicated by double arrowed lines) to the media application system 10. Specifically, the swirl gun 20 can include a mounting body 34 (FIG. 1) that is configured to physically couple the swirl gun 20 a robotic actuator 18. The robotic actuator 18 can be any device suitable to automatically actuate and position the spray nozzle 26 (FIG. 5) of the spray gun to a desired position and angle with respect to a work piece. For example, the robotic actuator 18 can be a multi-axis robotic arm that is communicatively coupled to one or more processors 12. Moreover, the robotic actuator 18 can include angular and/or linear sensors that provide information regarding the location of the robotic actuator 18 in physical space (e.g., three-dimensional coordinates indicative of the location of the robotic actuator). As used herein, the term "communicatively coupled" means that the components are capable of exchanging data signals with one another such as, for example, electrical signals via conductive medium, electromagnetic signals via air, optical signals via optical waveguides, and the like.

According to the embodiments described herein, a processor means any device capable of executing machine readable instructions. Accordingly, each of the one or more processors 12 may be a controller, an integrated circuit, a microchip, a computer, or any other computing device. The one or more processors 12 can be configured to execute logic or software and perform functions that control the movement of the robotic actuator 18 and/or the operation of the swirl gun 20. Specifically, the one or more processors 12 can be communicatively coupled to one or more memory components 14 that can store the logic and/or input received by the one or more processors 12. The memory components 14 described herein may be RAM, ROM, a flash memory, a hard drive, or any device capable of storing machine readable instructions.

Embodiments of the present disclosure comprise logic that includes machine readable instructions or an algorithm written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components. The logic can be configured such that, when executed by the one or more processors 12, the media application system 10 operates as a computer numerical controller (CNC) or digital numerical control (DNC), wherein motion of the swirl gun 20 and the emission of the media from the swirl gun 20 can be controlled, programmed, and/or automatically operated according to a program.

The media application system 10 can comprise a human machine interface (HMI) 16 for receiving positional input from a user and communicating the input to the one or more processors 12. Accordingly, the HMI 16 can be communicatively coupled with the one or more processors 12. The HMI 16 can be any device suitable for receiving tactile input, audio input, visual input, or the like and transforming the input into a signal that can be transmitted to the one or more processors 12. In some embodiments, the HMI 16 can be configured to direct the positioning of the robotic actuator 18 and, thus, the swirl gun 20. For example, the HMI 16 can be a touch pad or touch screen for receiving tactile input indicative of a desired motion of the robotic actuator 18 (i.e., angular or linear motion in in three-dimensional space) that controls the location and orientation of an attached swirl gun 20.

Figure 7:
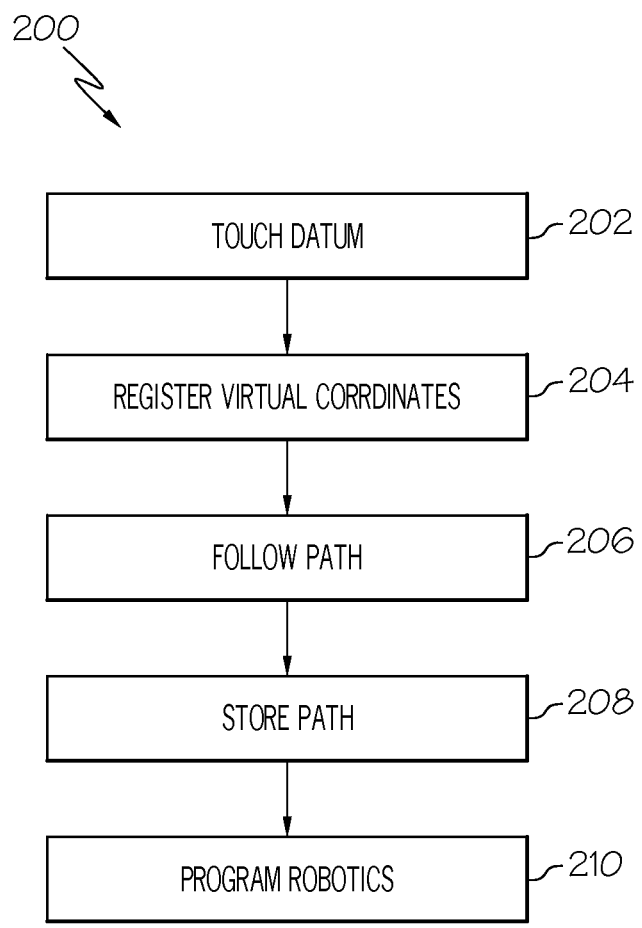
FIG. 7 schematically depicts a method for programming a media application system according to one or more embodiments shown and described herein.
Figure 8:
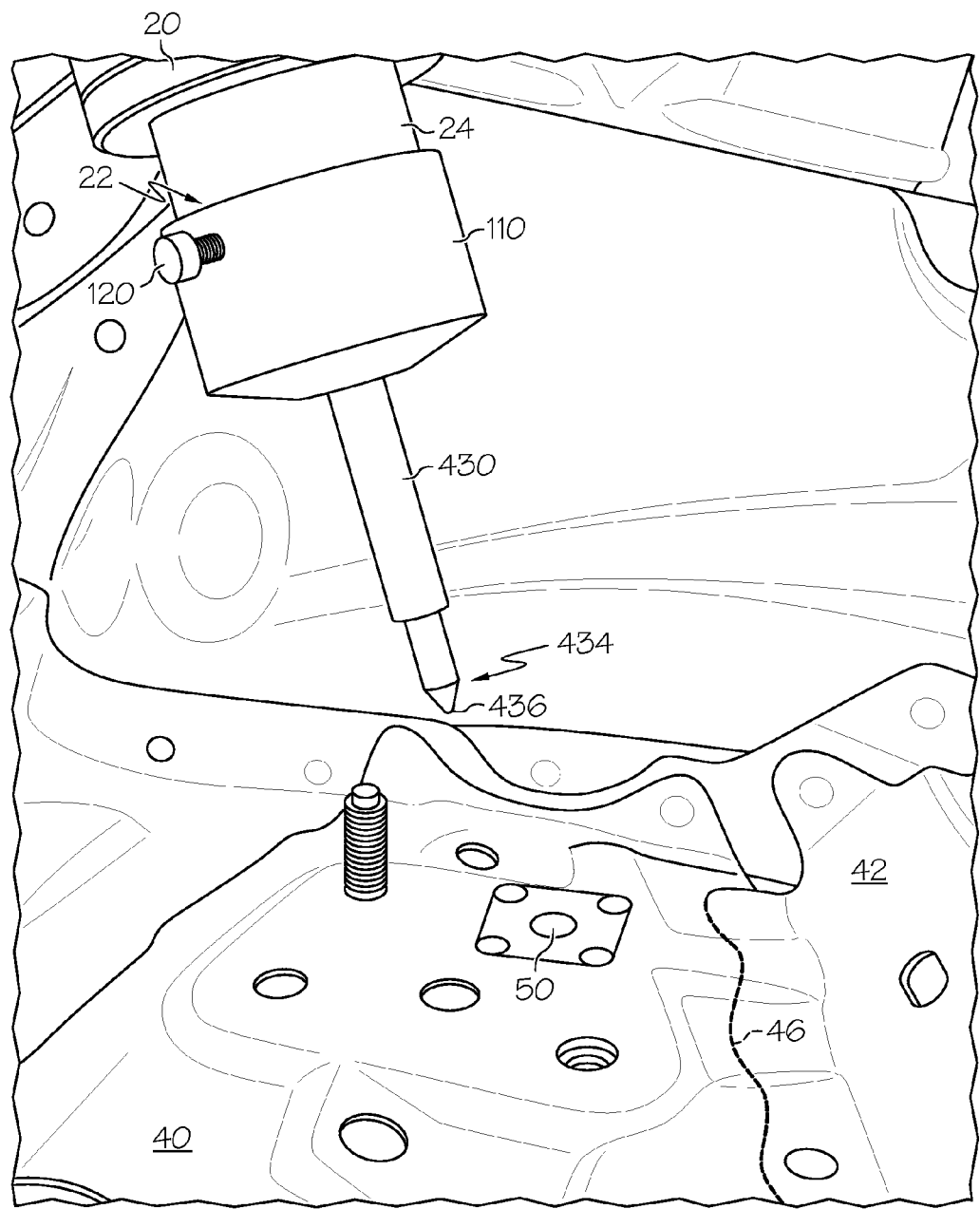
FIG. 8 schematically depicts a training assembly according to one or more embodiments shown and described herein.

It should now be understood that the embodiments described herein can be utilized to program a media application system 10 to apply media to a work piece according to a desired application path. Referring collectively to FIGS. 6-8, an exemplary method 200 for programming a media application system 10 is schematically depicted. The method 200 can include a plurality of processes that are performed automatically by the one or more processors 12. It is noted that, while a specific sequence of processes is indicated numerically in FIG. 7, the processes described herein may be performed in any sequence. Moreover, one or more of the processes can be excluded without departing from the embodiments of the present disclosure.

The one or more processors 12 can coordinate and control various processes to operate as a CNC. Accordingly, the one or more processors 12 can automatically provide a virtual model that comprises a three-dimensional coordinate system. Moreover, the one or more processors 12 can automatically cause the swirl gun 20 to be placed at any location and position within the range of motion of the robotic actuator 18. In some embodiments, the virtual model can include one or more registration points that can be mapped to the physical space that the robotic actuator 18 operates in.

At process 202, the elongate tactile member 330 can touch one or more datum points 50 in physical space that correspond to the registration points in the virtual model. It may be desirable to utilize the elongate tactile member 430 that has a point 436 at the distal end 434 of the elongate tactile member 430. As is noted above, the elongate tactile member 430 can be more rigid than the elongate tactile member 130 and the elongate tactile member 330. Accordingly, without being bound to theory, it is believe that the more rigid of the elongate tactile members can be utilized to provide more accurate positional information of the robotic actuator 18 in physical space. The positional information can be stored in the one or more memory components 14.

In some embodiments, each of the elongate tactile member 130, the elongate tactile member 330 and the elongate tactile member 430 can have a known length (e.g., desired distance D depicted in FIG. 5). The known lengths can be accessible by the one or more processors 12 such that the distance from the swirl gun 20 to the distal end of the respective elongate tactile member can be calculated based upon locational information from the robotic actuator 18. Accordingly, each of the elongate tactile member 130, the elongate tactile member 330 and the elongate tactile member 430 can have differing lengths, so long as each respective length is known.

At process 204, the registration points in the virtual model can be registered, automatically, to the positional information of the one or more datum points 50. Accordingly, the positional information from physical space can be translated into the coordinate system of the virtual model. Similarly, the coordinate system of the virtual model can be translated into positional information of the physical space. Thus, the virtual model can be utilized to direct the robotic actuator 18 to desired locations automatically.

At process 206, any of the elongate tactile members can be utilized to follow a program path 46. In some embodiments, it may be preferred to utilize the relatively flexible elongate tactile members. For example, a seam 44 can be formed at a joint of a first automotive component 40 and a second automotive component 42. The seam 44 can take a tortuous path in physical space with frequent changes in all directions. Accordingly, it may be more difficult for a user to utilize the elongate tactile member 430 to map the program path 46 under the control of the HMI 16, i.e., because sudden changes in distance may make it difficult for the elongate tactile member 430 to clear obstructions along the program path 46 with the HMI 16.

Thus, in some embodiments, the elongate tactile member 430 can be changed to a more flexible member such as, the elongate tactile member 130 or the elongate tactile member 330 prior to following the program path 46. For example, in embodiments where the platforms are integral with the self aligning chuck 110, the releasable engagement feature 120 can be disengaged from the swirl gun 20 to allow for swapping of elongate tactile members. Referring collectively to FIGS. 2 and 6-8, in embodiments where the platforms are releasably engaged with the self aligning chuck 110, a suitable replacement platform can be swapped. Specifically, the releasable engagement feature 452 of the platform 440 can be disengaged from the releasable engagement feature 122 of the self aligning chuck 110. Thereafter, the releasable engagement feature 152 of the platform 140 or the releasable engagement feature 352 of the platform 340 can be engaged with the releasable engagement feature 122 of the self aligning chuck 110.

When the releasable engagement feature 152 of the platform 140 is utilized, the laser beam emitted by the laser sight 160 can be directed along the program path 46 to indicate the center of the spray pattern. The elongate tactile member 130 and/or the offset elongate tactile member 230 can be utilized to provide an indication of the width of the spray pattern. Thus, the robotic actuator 18 can be guided along a path that is offset from the program path 46 by the desired distance D (FIG. 5) by keeping the distal end 134 in contact with the first automotive component 40 and the distal end 234 in contact with the second automotive component 42. Due to their relative flexibility, one or both of the elongate tactile member 130 and the offset elongate tactile member 230 can deflect when an obstruction is encountered. Moreover, should the elongate tactile member 130 and/or the offset elongate tactile member 230 lose contact with the first automotive component 40 and/or the second automotive component 42, the laser beam can be utilized to provide visual indication of the spray pattern.

At process 208, the positional information of the robotic actuator 18 sensed, via sensors configured to detect the location of the robotic actuator 18 in physical space, as the robotic actuator 18 is moved along the program path 46 can be stored in the one or more memory components 14. Specifically, the positional information can be tracked continuously and stored as data indicative of the program path 46. Alternatively, individual points along the program path 46 can be recorded, and data indicative of the program path 46 can be determined by the one or more processors 12 by linking the recorded points. At process 210, the robotic actuator 18 can be programmed according to the data indicative of the program path 46 i.e., the data indicative of the program path 46 can be transformed automatically into a sequence of motions that can be stored in the one or more memory components 14 and repeated by the robotic actuator 18 as the swirl gun 20 applies the media to the seam 44.

It should now be understood that the embodiments described herein can be utilized to program a media application system to apply media to articles of manufacture in a manner that yields a high quality application. Moreover, various interchangeable tactile members can be utilized to improve the speed and ease of programming CNC controllers. Specifically, flexible tactile members paired with a laser sight can allow increased freedom of motion of the robotic actuator during the training process and improved feedback to an operator regarding the center of the spray nozzle, the optimal spacing from the work piece, and the width of the sprayed media at the optimal spacing. Accordingly, media application systems can be trained to apply a high quality sealant or adhesive on a convoluted seam.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A training assembly for programming a media application system comprising:
   a self aligning chuck comprising an alignment orifice formed therein, wherein the alignment orifice receives a spray nozzle of a media applicator and the self aligning chuck is held at a fixed position relative to the spray nozzle of the media applicator; and
   an elongate tactile member engaged with the self aligning chuck, the elongate tactile member having a proximal end that is proximal to the media applicator and a distal end that is a desired distance away from the spray nozzle of the media applicator.

2. The training assembly of claim 1, further comprising:
   a platform engaged with the proximal end of the elongate tactile member, the platform comprising a first releasable engagement feature and a platform reference feature; and
   a second releasable engagement feature and a chuck reference feature formed in the self aligning chuck, wherein the first releasable engagement feature of the platform and the second releasable engagement feature of the self aligning chuck are releasably engaged such that the platform reference feature is in contact with the chuck reference feature.

3. The training assembly of claim 2, wherein the first releasable engagement feature of the platform and the second releasable engagement feature of the self aligning chuck are threaded.

4. The training assembly of claim 2, wherein the platform reference feature is a proximal surface of the platform and the chuck reference feature is a distal surface of the chuck.

5. The training assembly of claim 2, wherein the elongate tactile member is axially aligned with the spray nozzle of the media applicator.

6. The training assembly of claim 5, wherein the elongate tactile member is a solid body that tapers to a point at the distal end of the elongate tactile member.

7. The training assembly of claim 5, wherein the elongate tactile member is formed from a coil spring.

8. The training assembly of claim 2, further comprising a laser sight coupled to the platform, wherein the laser sight emits a laser beam that travels along a laser path and the laser path is axially aligned with the spray nozzle of the media applicator.

9. The training assembly of claim 1, further comprising:
   an offset elongate tactile member engaged with the self aligning chuck, wherein the offset elongate tactile member is offset from the elongate tactile member by an offset distance.

10. The training assembly of claim 9, further comprising a laser sight coupled to the self aligning chuck, wherein the laser sight emits a laser beam that travels along a laser path, and wherein the laser path is axially aligned with the spray nozzle of the media applicator and disposed between the elongate tactile member and the offset elongate tactile member.

11. The training assembly of claim 9, wherein the spray nozzle of the media applicator is configured to emit a spray pattern, and the offset distance between the offset elongate tactile member and the elongate tactile member is indicative of a width of the spray pattern.

12. The training assembly of claim 1, wherein a protective cover is disposed between the alignment orifice of the self aligning chuck and the spray nozzle of the media applicator.

13. The training assembly of claim 1, wherein the media applicator is a swirl gun.

14. A training assembly for programming a media application system comprising:
   a self aligning chuck comprising an alignment orifice formed therein, wherein the alignment orifice receives a spray nozzle of a swirl gun and the self aligning chuck is held at a fixed position relative to the spray nozzle of the swirl gun;
   an elongate tactile member engaged with the self aligning chuck;
   an offset elongate tactile member engaged with the self aligning chuck, wherein each of the elongate tactile member and the offset elongate tactile member has a proximal end that is proximal to the swirl gun and a distal end that is a desired distance away from the spray nozzle of the swirl gun, and wherein the distal end of the offset elongate tactile member and the distal end of the offset elongate tactile member is offset by an offset distance such that the offset distance is substantially equal to a width of a spray pattern of the spray nozzle of the swirl gun at the desired distance; and a laser sight coupled to the self aligning chuck and disposed between the elongate tactile member and the offset elongate tactile member, wherein the laser sight emits a laser beam that travels along a laser path, and wherein the laser path is axially aligned with the spray nozzle of the swirl gun.

15. The training assembly of claim 14, wherein the elongate tactile member is formed from a polymer.

16. The training assembly of claim 14, further comprising:
a platform engaged with the proximal end of the elongate tactile member, the platform comprising a first releasable engagement feature and a platform reference feature; and
a second releasable engagement feature and a chuck reference feature formed in the self aligning chuck, wherein the first releasable engagement feature of the platform and the second releasable engagement feature of the self aligning chuck are releasably engaged such that the platform reference feature is in contact with the chuck reference feature.

17. A method for programming a media application system comprising:
receiving a spray nozzle of a swirl gun within an alignment orifice of a self aligning chuck, wherein the self aligning chuck is engaged with an elongate tactile member and a laser sight, and wherein the elongate tactile member has a distal end that terminates a desired distance away from the spray nozzle of the swirl gun and the laser sight emits a laser beam along a laser path that is axially aligned with the spray nozzle of the swirl gun;
aligning the laser beam with a program path along a work piece;
following the program path along the work piece such that the elongate tactile member is in contact with the work piece at least once, and out of contact with the work piece at least once;
storing data indicative of the program path in one or more memory components; and
transforming, automatically with one or more processors, the data indicative of the program path into a sequence of motions to be followed by a robotic actuator.

18. The method of claim 17, further comprising deflecting the elongate tactile member with the work piece.

19. The method of claim 17 further comprising:
contacting one or more datum points on the work piece with a point of a second elongate tactile member;
disengaging the second elongate tactile member from the swirl gun; and
engaging the elongate tactile member with the swirl gun, wherein the second elongate tactile member is more rigid than the elongate tactile member.

20. The method of claim 17, wherein the swirl gun is coupled to the robotic actuator, while the program path is followed.

* * * * *